United States Patent
Stovold

(10) Patent No.: US 6,672,718 B1
(45) Date of Patent: Jan. 6, 2004

(54) AQUEOUS LATENT IMAGE PRINTING METHOD AND AQUEOUS LATENT IMAGE PRINTING INK FOR USE THEREWITH

(75) Inventor: Terry Stovold, Saranac, NY (US)

(73) Assignee: Laser Lock Technologies, Inc., Bala Cynwyd, PA (US)

( * ) Notice: Subject to any disclaimer, the term of this patent is extended or adjusted under 35 U.S.C. 154(b) by 0 days.

(21) Appl. No.: 10/202,423

(22) Filed: Jul. 23, 2002

(51) Int. Cl.$^7$ .................................................. B41J 2/01
(52) U.S. Cl. ........................ 347/100; 347/101; 347/96
(58) Field of Search ................................ 347/100, 101, 347/96; 106/31.14, 31.13

(56) References Cited

U.S. PATENT DOCUMENTS

| | | | |
|---|---|---|---|
| 4,251,824 A | 2/1981 | Hara et al. | |
| 4,410,899 A | 10/1983 | Haruta et al. | |
| 4,412,224 A | 10/1983 | Sugitani | |
| 4,532,530 A | 7/1985 | Hawkins | |
| 4,601,777 A | 7/1986 | Hawkins et al. | |
| 5,395,432 A | 3/1995 | Nelson et al. | |
| 5,443,629 A | * 8/1995 | Saville et al. | 106/31.17 |
| 5,935,308 A | 8/1999 | Siddiqui et al. | |
| 6,084,621 A | * 7/2000 | Shioya | 347/101 |
| 6,478,866 B1 | * 11/2002 | Nyssen et al. | 106/31.6 |

\* cited by examiner

Primary Examiner—Stephen D. Meier
Assistant Examiner—Manish Shah
(74) Attorney, Agent, or Firm—Duane Morris LLP

(57) ABSTRACT

The present invention relates to an aqueous latent image printing method which includes applying to a substrate, such as paper, a latent image ink composition, via an ink jet printer. The latent image is then activated to render it visible, by application of an activator.

7 Claims, No Drawings

AQUEOUS LATENT IMAGE PRINTING METHOD AND AQUEOUS LATENT IMAGE PRINTING INK FOR USE THEREWITH

FIELD OF THE INVENTION

The present invention relates to the field of security printing, in general, as well as to the field of ink jet printing and compositions useful therein. This invention particularly relates to an aqueous latent image printing method and an aqueous latent image printing ink for use therewith.

BACKGROUND OF THE INVENTION

In an aqueous latent image printing method, information is printed on a substrate, such as paper, which is transferred in the form of a latent image or "secure image" which is invisible to the eye and any other usual image detecting device at the time of printing, and is revealed only after the substrate is subjected to a subsequent process of image activation.

Invisible inks have existed for many years. Many such ink systems have been found, developed and used in a limited way mainly because of the limited accessibility of such invisible inks and delivery systems for the latter.

A problem with the use of latent image printing for the purpose of product identification was that no good means existed for placing such information on a variety of substrates. Contact printing is not suitable for many such uses, as there is no good means to place the image on the desired substrate if it is irregularly shaped or is substantially inaccessible to traditional contact printing devices. Thus, latent image variable information such as production date, lot number, batch number, serial number, and the like, could not be placed on many products, except by hand, which is cumbersome, expensive, and prone to inaccuracies, defeating the purpose of using such information.

To address such problems, ink jet technology has been employed for security printing. Ink jet printing systems generally are of two types: continuous stream and drop-on-demand. In continuous stream ink jet systems, ink is emitted in a continuous stream under pressure, through at least one orifice or nozzle. In drop-on-demand systems, a droplet is expelled from an orifice directly to a position on a recording medium in accordance with digital data signals. Since drop-on-demand systems require no ink recovery, charging, or deflection, the system can be much simpler than the continuous stream type.

There are two types of drop-on-demand ink jet systems. One type of drop-on-demand system has as its major components an ink filled channel or passageway, having a nozzle on one end and a piezoelectric transducer near the other end to produce pressure pulses.

The other type of drop-on-demand system is known as thermal ink jet, or bubble jet, and produces high velocity droplets and allows very close spacing of nozzles. The major components of this type of drop-on-demand system are an ink filled channel having a nozzle on the open end and a heat generating resistor near the nozzle. The drop-on-demand ink jet printers provide simpler, lower cost devices than their continuous stream counterparts, and yet have substantially the same high speed printing capability. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530.

U.S. Pat. No. 5,395,432 teaches the use of certain ink jet compositions for use in printing latent images an a substrate. In accordance with that patent, ink jet compositions comprising zinc chloride are taught for use in making latent images. A problem associated with those formulations, however, is their corrosiveness to metal parts of the printing apparatus with which the ink comes into contact.

U.S. Pat No. 5,935,308 purports to address this problem. The '308 patent teaches the use of certain ink jet compositions for use in printing latent images on a substrate. In accordance with the '308 patent, ink jet compositions comprising zinc bromide and preferably tetraethylammonium p-toluene sulfonate ("TEA p-TS") are taught for use in making latent images.

It would be desirable to provide an ink jet composition for latent image printing that is not corrosive.

All references cited herein are incorporated herein by reference in their entireties.

SUMMARY OF THE INVENTION

The present invention provides an aqueous latent image printing method comprising applying to a substrate, such as paper, a latent image ink composition, via an ink jet printer. Subsequently, the latent image is activated to render it visible, by application of an activator.

Embodiments of the present invention are particularly suitable for security printing on a substrate which enables the free flow of information without the concern for fraud. The information that is printed on a substrate is invisible to the naked eye, and cannot be revealed without the use of an activator. This method is particularly useful for authentication and identification of financial transactions on the internet, such as checks, to secure the privacy of the user.

DETAILED DESCRIPTION OF PREFERRED EMBODIMENTS

The present invention provides a printing composition comprising an aqueous medium, i.e. water, a hydroquinonesulfonic acid salt, and a humectant Suitable humectants typically include organic materials miscible with water. The preferred humectant of the present invention is polyethylene glycol. Examples of other suitable humectants that can be used include ethylene glycol, propylene glycol, diethylene glycols, glycerine, dipropylene glycols, polypropylene glycols, amides, urea, substituted ureas, ethers, carboxylic acids, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. The humectant can be present in the ink composition in any effective amount. Typically, the water to organic ratio is from about 100:0 to about 30:70, preferably from about 97:3 to about 50:50, although the ratio can be outside this range.

The preferred latent image former is hydroquinonesulfonic acid salt. The amount of hydroquinonesulfonic acid salt used in the latent ink formulations can vary over a wide range, depending on the intensity of the latent image that is desired, and the solubility of the hydroquinonesulfonic acid salt in the aqueous medium. Typically, the amount of hydroquinonesulfonic acid salt present will vary from about 0.5 percent up to about 7 percent, with the preferred amount being 3 to 7 percent.

The present printing composition can be printed on a substrate, for example, paper via a conventional printing process, preferably an ink jet printer. Other preferred printing processes include a commercial bubble jet printer, a flexographic or gravure press, a coater or other methods of printing with aqueous inks.

Aqueous inkjet compositions must meet certain rigid requirements to be useful in ink jet printing operations. These relate to viscosity, resistivity, solubility, compatibility of components and wettability of the substrate. Also, the ink must be quick-drying and smear resistant, must be capable of passing through the ink jet nozzle without clogging, and must permit rapid cleanup of the machine components with minimum effort.

The ink composition of the present invention has been constructed to work effectively on all thermal or bubble jet printing equipment.

In preferred embodiments, once the ink is printed on the substrate, it is activated by an activator which is soluble in water and is applied over the invisible printed ink to result in a permanent color change which makes the information printed on the substrate visible in ambient light.

In preferred embodiments, the latent aqueous ink is a hydroquinonesulfonic acid salt of potassium or sodium which is placed in water with polyethylene glycol and mixed by standard mixing equipment to make an invisible, colorless ink. This ink is applied via a printing device to create an invisible, message or mark on a substrate, such as paper, cardboard, plastic, metal, etc. A ferric salt activator which is soluble in water can then be applied over the printed ink to effect a permanent color change due to the reaction product formed from the mixture of the ferric salt and the hydroquinonesulfonic acid (sodium or potassium) salt.

In further preferred embodiments of the present invention, the substrate, such as paper, etc., can be prepared ahead of time with security features that make the ink totally invisible under different wavelengths of light and secure against attempted alterations. The paper can then be sent to a user, via mail or fax, without the concern of others intercepting private information. After the user receives the paper, the information can be revealed by applying the ferric salt activator.

Further embodiments of the present invention include a method for covertly communicating information which comprises applying an aqueous solution of a hydroquinonesulfonic acid salt and polyethylene glycol to the substrate. In accordance with the invention, the acid salt is capable of reacting with a water soluble ferric salt to produce a reaction product having a color which is visible in ambient light. The method of printing the aqueous ink uses any conventional method of printing aqueous ink onto a substrate, but preferably comprises the use of an ink jet printer.

Unlike certain prior art compositions, the present invention provides an aqueous composition. The aqueous ink can be printed on a substrate via a conventional printing process, such as by use of an inkjet printer, a commercial bubble jet printer, a flexographic or gravure press, a coater or other methods of printing water based inks.

While the invention has been described in detail and with reference to specific examples thereof, it will be apparent to one skilled in the art that various changes and modifications can be made therein without departing from the spirit and scope thereof.

What is claimed is:

1. A method for covertly communicating information, comprising:

applying a printing composition including an aqueous medium, a hydroquinonesulfonic acid salt in said aqueous medium, and a humectant in said aqueous medium, wherein said printing composition is adapted to print a latent image that reacts with a water soluble salt to produce a reaction product having a color visible in ambient light, to a substrate to encode said information on said substrate; and reacting said printing composition on said substrate with said water soluble salt to decode said information.

2. The method according to claim 1 wherein said method produces a reaction product having a color visible in ambient light.

3. The method according to claim 2, wherein said hydroquinonesulfonic acid salt is a sodium or potassium salt.

4. The method according to claim 3, wherein said humectant is polyethylene glycol.

5. The method according to claim 4, wherein said humectant is at least one member selected from the group consisting of ethylene glycol, propylene glycol, diethylene glycols, glycerine, dipropylene glycols, polypropylene glycols, amides, urea, substituted ureas, ethers, carboxylic acids, esters, alcohols, organosulfides, organosulfoxides, sulfones, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and mixtures thereof.

6. The method according to claim 5, wherein said information is printed via an ink jet printer.

7. The method according to claim 6, wherein said water soluble salt is a ferric salt.

* * * * *